United States Patent [19]

Wood

[11] 3,860,921
[45] Jan. 14, 1975

[54] SIMULTANEOUS ACQUISITION OF TRACKING DATA FROM TWO STATIONS

[76] Inventors: James C. Fletcher, Administrator of the National Aeronautics and Space Administration with respect to an invention of Gordon E. Wood, La Canada, Calif.

[22] Filed: Nov. 15, 1973

[21] Appl. No.: 416,135

[52] U.S. Cl................ 343/6.5 R, 343/9, 343/17.5, 343/100 ST
[51] Int. Cl............................................. G01s 9/56
[58] Field of Search......... 343/6.5 R, 6.5 LC, 6.8 R, 343/6.8 LC, 17.5, 9, 8, 100 ST

[56] References Cited
UNITED STATES PATENTS

| | | | |
|---|---|---|---|
| 3,310,802 | 3/1967 | Coleman et al.................. | 343/6.5 R |
| 3,487,462 | 12/1969 | Holberg............................ | 343/17.5 |
| 3,530,252 | 9/1970 | Puente............................. | 343/6.5 R |
| 3,691,559 | 9/1972 | Jackson............................ | 343/6.5 R |
| 3,735,335 | 5/1973 | Kaplan et al..................... | 343/6.5 R |

*Primary Examiner*—Maynard R. Wilbur
*Assistant Examiner*—G. E. Montone
*Attorney, Agent, or Firm*—Monte F. Mott; Paul F. McCaul; John R. Manning

[57] ABSTRACT

A method and apparatus is disclosed for obtaining simultaneous tracking data from two ground stations relative to a spacecraft, and in particular for obtaining two-way range and doppler measurements with respect to the spacecraft using only one transponder on the spacecraft. The technique employs simultaneous transmission from two stations to produce a return signal with upper and lower sidebands resulting from the interference of the two transmissions. A transponder transmits the upper and lower sidebands centered about a carrier received by both stations. One station tracks the carrier and the other tracks a sideband aided by the carrier.

10 Claims, 3 Drawing Figures

SIMULTANEOUS ACQUISITION OF TRACKING DATA FROM TWO STATIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to simultaneous acquisition of tracking data from two stations relative to one spacecraft, and more particularly to obtaining such tracking data using only one transponder to transmit a return signal to both stations in response to independent transmissions from the separate stations.

For some time, there has been interest in obtaining simultaneous, or nearly simultaneous, tracking data from two ground stations relative to one spacecraft. It has been assumed that these data would require the acquisition of three-way data systems, or alternating the uplink transmission assignment. A three-way data system is very sensitive to inter-station timing synchronization and master oscillator frequency errors. Alternating the transmission assignments is also an undesirable solution because it complicates the operational sequences and requires tight control of the transponder's electrical path length variation.

For true simultaneous data, the obvious approach would be to implement two independent transponders in the spacecraft. Such an approach would allow tracking by two stations simultaneously, and would constitute a multiple access tracking system, but the cost and power requirements of such an approach seem quite out of the question in realistic space projects. Yet, there is a need for simultaneous tracking from two ground stations. It is therefore necessary to seek other ways of obtaining simultaneous tracking data. It is the object of this invention to provide some new and economic way to obtain simultaneous tracking data without using more than one transponder, and without alternating transmission assignments between two ground stations.

SUMMARY OF THE INVENTION

This and other objects of the present invention are achieved by employing two ground stations for transmitting simultaneously while independently employing a frequency at the second station sufficiently removed from the frequency of the first station so there will be no interference with the first station's effort to track the spacecraft. The two signals from the ground stations produce a beat frequency at the transponder which is the difference frequency between the two ground station signals. The transponder tracks the carrier signal from the first station by means of a phase-locked loop and retransmits this carrier signal after coherently multiplying its phase by a constant, G. Spaced around this retransmitted carrier are sidebands modulated by the phase detected signal of the beat signal which may have modulated on it independent binary valued ranging signals from the two stations. The first station tracks the downlink carrier from the spacecraft. The second station tracks one of the sidebands on the downlink carrier. After performing doppler extraction on the sideband signal received at the second station, the result is a measurement of two-way doppler relative to the second station but still with an error term requiring the estimation of the frequency of the first station. That error term is eliminated by combining a normal three-way mode carrier signal at the second station which, of course, includes the frequency of the first station with a doppler shift from the first station to the transponder and a doppler shift from the transponder to the second station. That is accomplished by tracking the carrier of the transponder at the second station, multiplying it by a constant, (G-1)/G, and combining the product with the frequency of the transmitter in the second station through a mixer to provide a reference signal for doppler extraction. When both stations include binary valued ranging modulation in the signals being transmitted, the ranging data from the first station will be modulated on the downlink carrier, as in normal ranging from the first station, and the ranging data from the second station will inherently be modulated on the sidebands created by the beat frequency signal of the two range station signals received at the transponder and modulated on the downlink carrier. The second station may therefore obtain ranging data directly from the sideband being tracked.

DESCRIPTION OF THE PREFERRED EMBODIMENTS

Figure 1:
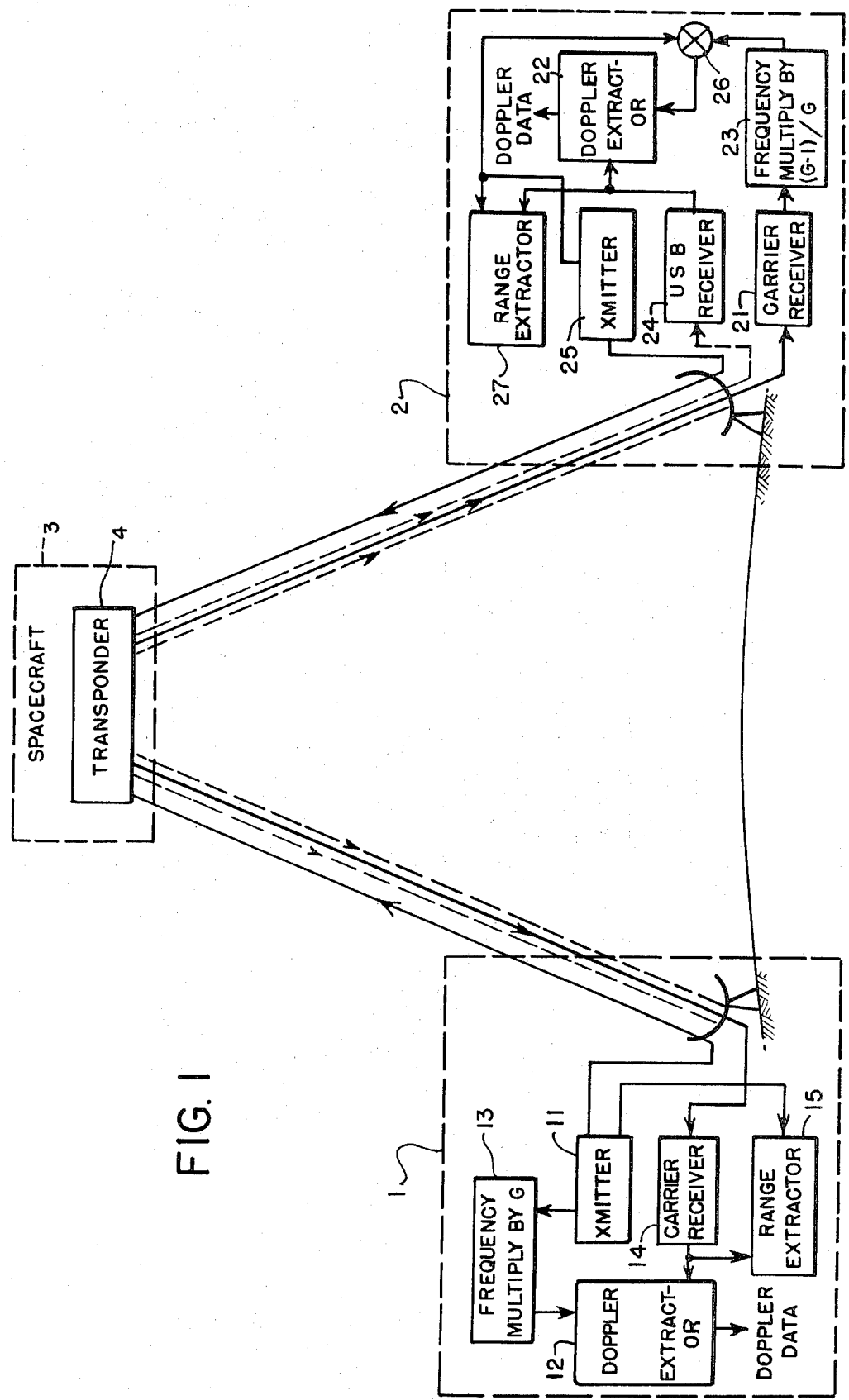
FIG. 1 illustrates an exemplary embodiment of the present invention.

Referring now to FIG. 1, there is illustrated a first ground station 1 and a second ground station 2 for tracking a spacecraft 3 having a single transponder 4. As shown, station 1 is in two-way communication with the spacecraft for normal tracking. A transmitter 11 operates with binary-valued ranging signal modulated on a carrier of frequency $f_1$. The transmitter also provides a coherent reference signal at the frequency $f_1$ for the doppler extractor 12. That reference signal is multiplied in a frequency multiplier 13 by a constant, G, equal to a turnaround frequency ratio of the spacecraft transponder, typically 240/221.

The signal received by the transponder is at a frequency $f_1$ shifted by one-way doppler. This frequency is multiplied by the factor G and retransmitted. When received back at station 1 by a carrier receiver 14, it has again been shifted by doppler producing a received frequency at station 1 of $f_{s1}$ $$f_{s1} = GD_{1s}D_{s1}f_1$$

(1)

where $G$ = spacecraft transponder frequency turnaround ratio $D_{1s}$ = one-way doppler shift from station 1 to the spacecraft = $(1 - [\dot{\rho}_{1s}/c])$ $D_{s1}$ = one-way doppler shift from the spacecraft to station 1 = $(1 - [\dot{\rho}_{s1}/c])$ $\dot{\rho}$ = radial velocity of spacecraft Note that the order of paired subscripts 1, s and 2 denote the points and direction of signal propagation as between station 1 and the spacecraft, s, and between the spacecraft and station 2.

The output of the receiver 14 is also applied to a range extractor 15. There the range signal is detected and the time difference between the transmitted range signal and the received ranging signal is determined in the usual manner to provide range data.

The corresponding one-way doppler shift between the spacecraft and station 2 is a quantity $(1 - [\dot{\rho}_{s2}/c])$ designated $D_{s2}$. The frequency $f_{s2}$ of the carrier signal received by station 2 is then $$f_{s2} = G\, D_{1s}\, D_{s2}\, f_1 \qquad (2)$$

The objective of station 2 is to provide range and doppler data between it and the spacecraft. In order to extract doppler data by standard three-way doppler techniques, station 2 must generate an estimate $\hat{f}_1$ of the carrier frequency $f_1$, multiply it by $G$, and subtract it from the received carrier frequency, i.e., and subtract it from equation (2). Carrying out the doppler extraction and dropping second order terms, the result is $$f_{s2} - G\hat{f}_1 = GD_{1s}D_{s2}f_1 - G\hat{f}_1$$
$$f_{s2} - G\hat{f}_1 = G\,(1-[\dot{\rho}_{1s}/c])\,(1-[\dot{\rho}_{s2}/c])\,f_1 - G\hat{f}_1$$
$$f_{s2} - G\hat{f}_1 = G\,(f_1 - \hat{f}_1) - [G(\dot{\rho}_{1s} + \dot{\rho}s2)/c]f_1 \qquad (3)$$

The true doppler shift is given by the second term of Equation (3); the error introduced is the quantity given by the first term. This standard three-way doppler technique is inaccurate because of this error in estimating the frequency of the carrier. To eliminate that error, the interference doppler tracking technique of the present invention is provided.

A carrier receiver 21 couples the signal $f_{s2}$ to a doppler extractor 22 via a coherent frequency multiplier 23. There the signal is multiplied by $(G-1)/G$ for reasons which will become apparent from the following description.

While station 1 is transmitting at frequency $f_1$, station 2 transmits at a frequency $f_2$ sufficiently removed from the frequency $f_1$ so that there will be no interference with the tracking functions of station 1, and great enough that the relative doppler of station 2 will not cause its frequency to cross over the frequency of station 1 at the spacecraft. The latter restriction is trivial because a few kilohertz would suffice, and the frequency difference can be arbitrarily set as great as 750 kilohertz.

When the signals transmitted by stations 1 and 2 are received at the spacecraft, a beat frequency is produced exactly equal to the difference between the received signals, namely $f_2D_{2s} - f_1D_{1s}$. This beat frequency is retransmitted as upper and lower sidebands on the carrier transmitted by the spacecraft transponder. These sidebands are indicated in FIG. 1 by dotted lines on both sides of the lines representing the carrier transmitted to stations 1 and 2 by the transponder 4 at a frequency $G\,D_{1s}f_1$. The transmitted sidebands $f_{SB}$ are, of course, at frequencies $$f_{SB} = G\,D_{1s}f_1 \pm (f_2D_{2s} - f_1D_{1s}) \qquad (4)$$

These sidebands can provide range and doppler tracking data relative to station 2.

Referring first to just the doppler tracking data relative to station 2, it should be noted that either sideband can be selected for the tracking function. The upper sideband is selected for purposes of illustration. At station 2, the normal three-way carrier frequency of Equation (2) is present with the upper sideband of Equation (4), both with a downlink doppler shift $D_{s2}$, as shown in the following equation $$f_{USB} = [G\,D_{1s}f_1 + (f_2D_{2s} - f_1D_{1s})]\,D_{s2} = [f_1\,(G-1)\,D_{1s} + f_2\,D_{2s}]\,D_{s2} \qquad (5)$$

Since the frequency $f_2$ is known at station 2 where it was generated, that frequency can be subtracted out of Equation (5) in normal doppler extraction. To accomplish that, station 2 acquires the upper sideband signal through a receiver 24 and applies it to the doppler extractor while the signal at frequency $f_2$ is applied to the doppler extractor from a transmitter 25. After subtraction, the doppler shift measured is $$f_D = f_1(G-1)\,D_{1s}D_{s2} - f_2\,([\dot{\rho}_{2s} + \dot{\rho}_{s2}]/c)$$

then subtracting the estimate of $f_1$ as in Equation (3)

$$f_D = (G-1)(f_1-\hat{f}_1) - (G-1)f_1\,([\dot{\rho}_{1s}+\dot{\rho}_{s2}]/c) - f_2\,([\dot{\rho}_{2s} + \dot{\rho}_{s2}]/c) \qquad (6)$$

Such a direct subtraction provides a two-way doppler shift measurement from station 2 to the spacecraft and back to station 2, but that still requires a knowledge of the frequency $f_1$ at station 2. The dependence of the doppler shift of Equation (6) on the signal at frequency $f_1$ has been reduced because of the smaller coefficient for its term vis-a-vis the corresponding term in the standard three-way doppler of Equation (3). It is evident that the error in Equation (6) has been reduced in magnitude to improve the doppler data to error ratio by a factor $G/(G-1)$. In that manner, use of the sideband provided by this beat frequency technique improves the doppler data at station 2 by that factor. Assuming $G = 240/221$, the improvement is by a factor of 12.63, which is a significant improvement. Greater improvement is still possible, however, as will now be described.

Since the downlink carrier, transmitted by the transponder in a normal three-way downlink manner, is still available at station 2 in the form expressed in Equation (2), it is possible to combine that with the sideband signal to form an unexpected result. That is accomplished by processing the carrier signal from receiver 21 through the frequency multiplier 23 where the multiplier is set at $(G-1)/G$, the result is a signal at frequency $f_1\,(G-1)\,D_{1s}D_{s2}$, which is simply Equation (2) multiplied by the factor indicated. The result is then added to the frequency $f_2$ through a multiplier (mixer) 26 to form a coherent signal that is at a frequency $f_c$ given by $$f_c = f_1\,(G-1)\,D_{1s}D_{s2} + f_2 \qquad (7)$$

That coherent frequency is then used as the reference in the doppler extractor to obtain the difference $$f_{USB} - f_c = [f_1(G-1)D_{1s} + f_2D_{2s}]\,D_{s2} - [f_1\,(G-1)\,D_{1s}D_{s2} + f_2]$$
$$= -f_2\,(\dot{\rho}_{2s} + \dot{\rho}_{s2}/c) \qquad (8)$$

That is what station 2 would have determined the two-way doppler shift to be if it had tracked the spacecraft in the normal two-way manner. Notice that even the turnaround frequency ratio G which would normally be required as a multiplier as in station 1 has been taken care of by this two-way and three-way hybrid implementation.

The discussion of the implementation has been referenced to the band of the transmitters, typically S-band, even though the actual process of doppler extraction is customarily done at lower frequencies in the stations. However, it is understood that the signals into the doppler extractor can be reduced in frequency by coherent frequency dividers without loss of data accuracy.

Figure 2:
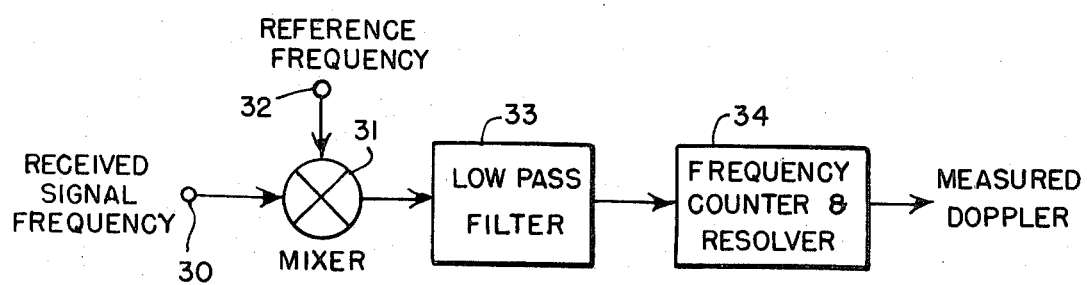
FIG. 2 illustrates a typical arrangement for a doppler extractor for the system of FIG. 1.

A typical organization for a doppler extractor will now be described with reference to FIG. 2. Briefly, the received signal at terminal 30 is multiplied in a mixer 31 by a reference signal 32 to obtain a difference frequency signal. For example, assuming the received signal is at a frequency $f_x$, and the reference signal at a frequency $f_r$, the output of the mixer will contain the components at frequencies equal to the sum, $(f_r + f_x)$, and difference, $(f_r - f_x)$. A low pass filter 33 filters out the sum component and transmits the difference component for processing in a frequency counter and resolver 34. The latter determines the frequency of the difference component to establish the measured doppler. Standard techniques are employed in the counter and resolver 34 to determine the doppler by counting cycles of the low pass filter output over a known period and to resolve the phase of the last cycle not completed within that period.

To perform simultaneous ranging by this interference technique, it is important to note a few facts about the design of a transponder ranging channel which is nothing more than a wideband video path connecting the received signal's modulation to a downlink phase modulator. The received RF signal is restored to baseband by a coherent detector at the input to the ranging channel. The overall noise bandwidth of the ranging channel is about 1.5 mHz. (after detection). The channel has a bandpass transfer function with a lower cutoff of about 2 kHz and an upper cutoff of about 1.2 mHz. The signal to be remodulated on the spacecraft downlink is passed through a limiter to provide a constant modulation index. Typically, the ranging channel consumes about 10% of the spacecraft transmitter's power when it is in operation.

Using a transponder ranging channel designed as just described, the spacecraft essentially returns on the downlink whatever ranging modulation is sent on the uplink and is within its passband. Of course, there is considerable noise also returned on the downlink since the front-end noise of the spacecraft receiver is also present in the ranging channel.

Figure 3:
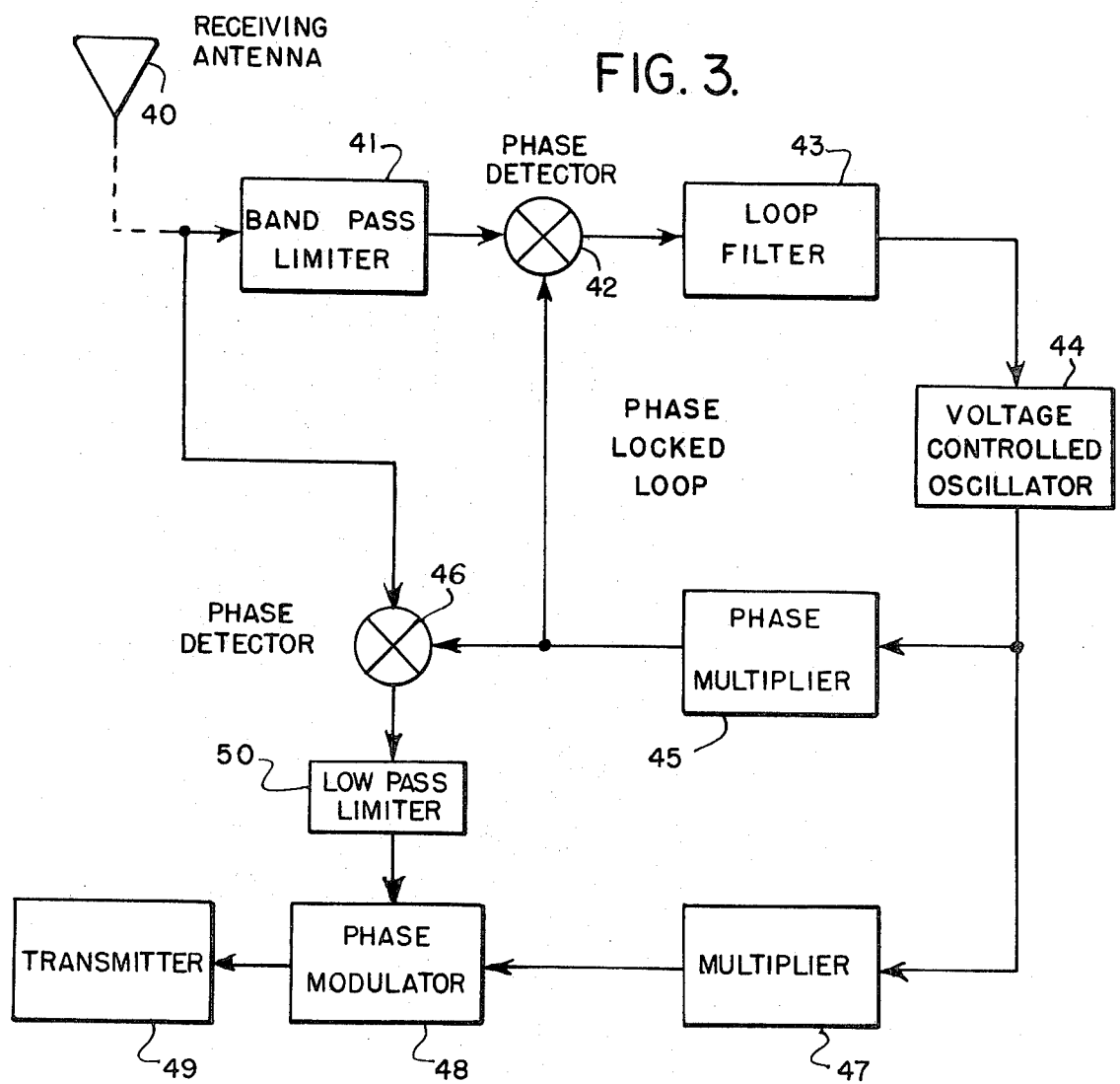
FIG. 3 illustrates a typical arrangement for a transponder ranging channel for the system of FIG. 1.

A typical transponder ranging channel is shown in FIG. 3. Briefly, the signal received by an antenna 40 is coupled by a carrier bandpass limiter 41 to a phase-locked loop to acquire the carrier of station 1. The phase-locked loop consists of a phase detector 42, loop filter 43, and voltage controlled oscillator 44 in a conventional manner. The output of the oscillator is not required to be at the frequency of the uplink carrier, but is then multiplied in a phase multiplier 45 by a factor that will make it equal. The output of the multiplier is then a local reference signal synchronized with the carrier of the received signal. That local reference is used in a phase detector 46 to detect the beat signal resulting from the interference between the carriers from stations 1 and 2 at the antenna and the binary valued ranging signal modulated on the uplink carrier from station 1. The detected beat signal includes the binary valued ranging signal modulated on the uplink carrier from station 2.

The frequency of the voltage controlled oscillator is multiplied in a multiplier 47 by a constant, and the product is coupled through a phase modulator 48 to a transmitter 49. The output of the phase detector 46 is coupled through a low pass limiter 50 to the phase modulator to modulate the output of the multiplier 47 with the detected ranging information from station 1 and the beat signal which carries the range information from station 2. In that manner, the downlink carrier, which is controlled in frequency by the phase-locked loop that tracks the uplink carrier from station 1, is transmitted as a carrier with sidebands which include information about range from stations 1 and 2.

In a typical S-band (2,115 mHz) system, the voltage controlled oscillator 44 is operating at a frequency 110.5 times lower, namely at 19.5 MHz. The phase multiplier 45 then multiplies that frequency by 110.5. The phase multiplier 47 multiplies by 120. Consequently, the turnaround frequency ratio, G, is 240/221.

The ranging phase detector 45 has a reference derived from the carrier tracking loop that is in quadrature with the received carrier in that loop. Thus, if a station has acquired the spacecraft in a normal two-way fashion with a signal of the form sin $(2\pi ft)$, the phase detector has a reference of the form cos $(2\pi ft)$. The frequency, $f$, of course, is the station's uplink frequency shifted by its one-way doppler to the spacecraft. The ranging detector, in essence, forms an output signal that is the product of the received signal and the reference.

Consider now simultaneous ranging from two stations. The uplink signal is essentially the sum of two equal power signals, such as $$S_{UL} = \sin(2\pi f_1't) + \sin(2\pi f_2't+\phi)$$

(9)

where
$f_1' = f_1 (1 - [\dot{\rho}_{1s}/c])$
$f_2' = f_2 (1 - [\dot{\rho}_{2s}/c])$
$\phi$ = arbitrary constant phase shift Since station 1 has acquired the spacecraft phaselocked loop the ranging detector has a reference of cos $(2\pi f_1't)$. The output of the detector is of the form
[sin $(2\pi f_1't)$ + sin $(2\pi f_2't + \phi)$] cos $(2\pi f_1't)$ = ½ sin $(4\pi f_1't)$ + ½ sin $(2\pi f_1't + 2\pi f_2't + \phi)$ − ½ sin $(2\pi f_1't - 2\pi f_2't - \phi)$      10.

Because of the bandpass filter design of the ranging channel, the first and second terms of Equation (10) are eliminated. The third term is the difference frequency beatnote described earlier.

If station 1 and station 2 now turn on ranging modulation, a fortunate thing will happen at the spacecraft. Let $\phi_1(t)$ be station 1's ranging modulation as received at the spacecraft and $\phi_2(t)$ be station 2's. Hence, the received signal will now have the form $S_{UL}' = \sin[2\pi f_1't + \theta_1(t)] + \sin[2\pi f_2't + \theta_2(t) + \phi]$ (11)

After detection and filtering in the ranging channel the signal appears in the form $$S_{ILD} = \tfrac{1}{2} \sin [\theta_1(t)] + \tfrac{1}{2} \sin [2\pi(f_2'-f_1')(t) + \theta_2(t) + \phi]$$

(12)

This is fortunate because when this is remodulated on the downlink the ranging data from station 1 will be lumped around the carrier, as in normal ranging, and the ranging data from station 2 will be lumped around the sidebands created by the interference in the ranging channel. Since station 2 is actually tracking one of the sidebands its ranging data is recoverable and simultaneous ranging can be performed. Of course, one must worry about sufficient turnaround ranging power being available at station 2.

With this interference technique, uplink and downlink spectrums have been created which have additional components. It is therefore desirable to analyze the effects on the command channel, data channel and normal ranging. The latitude for avoiding unwanted interference is great because the offset frequency between the uplinks can be rather arbitrarily set. Briefly, the possibilities for interference to the various channels are discussed below.

The command detector in the spacecraft is sensitive to power on the uplink within about ±2.5 KHz of the carrier controlling the spacecraft phase-locked loop. No problems are anticipated here because station 1, the noninterfering station, is controlling the loop. Furthermore, as stated earlier, the separation between uplinks must be kept great enough to prevent the diurnal doppler from confusing the system. As such, the interfering uplink will be kept well away from the command channel.

The downlink telemetry channel will have a data-modulated subcarrier present at all times while tracking. Hence, it is necessary that the downlink spectrum be kept relatively free from interference in the regions near the subcarrier. Since this subcarrier is normally in the range of 40 to 60 KHz for S-band, it is appropriate to keep the interference spectrum well away from the subcarrier and its harmonics, say above 180 KHz. During encounters the subcarrier is at 400 to 600 KHz. It is then reasonable to think that the uplink difference frequency could be moved down to the range of 50 to 200 KHz and circumvent problems at that time. Since the difference frequency can be set individually for each pass, this should pose no obstacle.

In the case of ranging, it is hard to visualize problems with the interference spectrum. Ranging always has to work with the telemetry subcarrier present and the interference signal should look no different. Analysis of a particular system will be necessary to determine the relative sharing of power when the two uplinks pass through the ranging channel limiter in the spacecraft.

In the foregoing, it was implicitly assumed that the two-way link was at S-band for the typical value of $G = 240/221$. However, there is no reason why a hybrid S-band/X-band tracking system cannot be employed. The differences are as follows.

Referring back to Equation (2), the normal three-way downlink to station 2 at X-band would be $$(880/221) D_{1s} D_{s2} f_1$$

(13)

and the upper sideband from interference tracking would be at $$[f_1 ([880/221] - 1) D_{1s} + f_2 D_{2s}] D_{s2}$$

(14)

This means that a coherent frequency multiplier of 659/880 is required to produce the same doppler term of $$-f_2 ([\dot{\rho}_{2s}/c] + [\dot{\rho}_{s2}/c])$$

as was the case in the S-band/S-band tracking. Note that the turnaround ratio of the doppler is still unity even with X-band interference doppler tracking.

For ranging, the same situation exists for S-band/X-band as for S-band/S-band. Hence, the same techniques can be employed without modification.

Since we have established that two stations can transmit simultaneously to one spacecraft, it is possible to hypothesize many variations of the basic invention. For example, with station 1 ranging as normal it would be possible to receive and detect the ranging modulation on the three-way downlink at station 2. If hardware was available at station 2 to reconstruct the received ranging signal, it could be retransmitted, back through the spacecraft to station 1. Hence, station 1 would have its normal two-way range data but, in addition, would have range data from station 1 to the spacecraft, to station 2 and back to the spacecraft to station 1. This may have the potential for providing very long baseline data from two stations with no need to synchronize the station clocks. Other variations will occur to those skilled in the art. Consequently, it is intended that the claims be interpreted to cover such variations.

What is claimed is:

1. A method for obtaining simultaneous tracking data from two ground stations relative to a spacecraft or aircraft carrying only one transponder, said stations transmitting independently at different stable frequencies spaced apart sufficiently to allow said transponder to track the frequency of a signal received from one station despite interference from the other station, interference of said transmitted signals produced a beat frequency signal at said transponder, said method comprising the steps of tracking said transmitted signal from said one station in said transponder to produce a coherent reference signal, transmitting a coherent carrier signal from said transponder to said ground station at a frequency that is a predetermined constant, $G$, times the frequency of said reference signal, phase detecting the signals received by said transponder with said reference signal, phase modulating said carrier signal transmitted by said transponder with the output signal of said phase detection, thereby providing a carrier signal with upper and lower sidebands, acquiring said carrier signal and performing doppler extraction at said one station as a measure of craft velocity relative to said one station, and acquiring one of said modulated sidebands and performing doppler extraction at said other station as a measure of craft velocity relative to said other station.

2. A method as defined in claim 1 wherein at least one of said stations modulates the signal transmitted to said craft with a binary valued ranging signal, whereby said output signal of said phase detection includes said ranging signal.

3. A method as defined in claim 1 wherein each of said stations modulates the signal transmitted to said craft with an independent binary valued ranging signal, whereby said output signal of said phase detection includes a ranging signal combined with said beat frequency signal, and said beat frequency signal is modulated with said ranging signal from said other station.

4. A method as defined in claim 3 wherein said doppler extraction in said other station from a sideband of said carrier is accomplished by tracking at said other station the carrier transmitted by said transponder, coherently multiplying the tracked carrier frequency by a constant, $(G-1)/G$, and adding the product of that multiplication to a coherent signal at the frequency of the signal transmitted by said other station thereby providing a reference signal at said other station for doppler extraction.

5. A method as defined in claim 3 wherein
said one station transmits at a frequency $f_1$ and the other station transmits at a frequency $f_2$, whereby the beat frequency signal is at a frequency $f_2 D_{2s} - f_1 D_{1s}$, where $D_{1s}$ is the doppler shift from said one station to said craft and $D_{2s}$ is the doppler shift from said other station to said craft,
the transmitted sidebands are at frequencies $G\, D_{1s} f_1 \pm (f_2 D_{2s} - f_1 D_{1s})$ and the upper sideband $f_{USB}$ is selected for acquisition at said other station, said upper sideband being at a frequency $[f_1 (G-1) D_{1s} + f_2 D_{2s}] D_{s2}$,
said signal transmitted by said one station is received by said other station at a frequency $G\, D_{1s} D_{s2} f_1$,
said doppler extraction at said other station is accomplished by coherently multiplying said received signal at frequency $G\, D_{1s} D_{s2} f_1$ by $(G-1)/G$ to obtain a signal at frequency $(G-1)\, D_{1s} D_{s2} f_1$, adding that signal to a signal at frequency $f_2$ to obtain a coherent signal $f_c = f_1 (G-1) D_{1s} D_{s2} + f_2$ for use as a reference in doppler extraction,
subtracting said reference signal from said sideband to obtain the difference therebetween, and
detecting the difference with phase resolution to obtain doppler frequency shift of the signal transmitted by said other station at frequency $f_2$ as a measure of craft velocity relative to said other station.

6. A system for obtaining simultaneous tracking data from two ground stations relative to a spacecraft or aircraft carrying only one transponder comprising
separate means at each of said stations for transmitting independently at different stable frequencies spaced apart sufficiently to allow said transponder to track the frequency of a signal transmitted by one station despite interference from the signal transmitted by the other station, interference of said transmitted signals producing a beat frequency signal at said transponder,
means for tracking said transmitted signal from said one station in said transponder to produce a coherent reference signal of the same frequency,
coherent multiplying means for multiplying said coherent reference signal by a predetermined constant, $G$, to produce a carrier signal to be transmitted by said transponder,
means for phase detecting signals received by said transponder using said reference signal,
means for phase modulating said carrier signal with the output signal of said phase detection means before transmission by said transponder, thereby providing a carrier signal transmitted by said transponder with upper and lower sidebands,
means for acquiring said carrier signal at said one station,
means for forming doppler extraction at said one station as a measure of craft velocity relative to said one station,
means acquiring one of said modulated sidebands at said other station, and
means for performing doppler extraction at said other station as a measure of craft velocity relative to said other station.

7. A system as defined in claim 6 wherein at least one of said stations includes means for modulating the signal transmitted to said craft with a binary valued ranging signal, whereby said output signal of said phase detection means in said transponder includes said ranging signal.

8. A system as defined in claim 6 wherein each of said stations includes means for modulating the signal transmitted to said craft with an independent binary valued ranging signal, whereby said output signal of said phase detection means in said transponder includes a ranging signal combined with said beat frequency signal, and said beat frequency signal is modulated with said ranging signal from said other station.

9. A system as defined in claim 8 wherein said means for doppler extraction in said other station from a sideband of said carrier includes means for tracking said carrier transmitted by said transponder, means for coherently multiplying the tracked carrier frequency by a constant, $(G-1)/G$, and means for adding the product of that multiplication to a coherent signal at the frequency of the signal transmitted by said other station, thereby providing a reference signal at said other station for doppler extraction.

10. A system as defined in claim 8 wherein said one station transmits at a frequency $f_1$ and the other station transmits at a frequency $f_2$, whereby said beat frequency signal is at a frequency $f_2 D_{2s} - f_1 D_{1s}$, where $D_{1s}$ is the doppler shift from said one station to said craft and $D_{2s}$ is the doppler shift from said other station to said craft, the transmitted sidebands are at frequencies $G\, D_{1s} f_1 \pm (f_2 D_{2s} - f_1 D_{1s})$ and the upper sideband $f_{USB}$ is selected for acquisition at said other station, said upper sideband being at a frequency $[f_1 (G-1) D_{1s} + f_2 D_{2s}] D_{s2}$, said signal transmitted by said one station is received by said other station at a frequency $G\, D_{1s} D_{s2} f_1$, and wherein
said doppler extraction means at said other station includes means for coherently multiplying said received signal at frequency $G\, D_{1s} D_{s2} f_1$ by $(G-1)/G$ to obtain a signal at frequency $(G-1)\, D_{1s} D_{s2} f_1$,
means for adding that signal to a signal at frequency $f_2$ to obtain a coherent signal $f_c = f_1 (G-1) D_{1s} D_{s2} + f_2$ for use as a reference in doppler extraction,
means for subtracting said reference signal from said sideband to obtain the difference therebetween, and
means for detecting the difference with phase resolution to obtain doppler frequency shift of the signal transmitted by said other station at frequency $f_2$ as a measure of craft velocity relative to said other station.

* * * * *